(12) United States Patent
Becker et al.

(10) Patent No.: US 7,205,252 B2
(45) Date of Patent: Apr. 17, 2007

(54) METHOD OF MAKING A GLASS-CERAMIC ARTICLE

(75) Inventors: Otmar Becker, Langen (DE); Falk Gabel, Schlangenbad (DE); Christian Roos, Mainz (DE); Bernd Ruedinger, Mainz (DE); Friedrich Siebers, Nierstein (DE); Michael Bug, Muehltal (DE); Ioannis Kosmas, Stadecken-Elsheim (DE); Wolfgang Schmidbauer, Mainz-Finthen (DE); Martin Mueller, Darmstadt (DE)

(73) Assignee: Schott AG, Mainz (DE)

( * ) Notice: Subject to any disclaimer, the term of this patent is extended or adjusted under 35 U.S.C. 154(b) by 185 days.

(21) Appl. No.: 11/124,849

(22) Filed: May 9, 2005

(65) Prior Publication Data

US 2005/0255983 A1 Nov. 17, 2005

(30) Foreign Application Priority Data

May 12, 2004 (DE) .................. 10 2004 024 584

(51) Int. Cl.
*C03C 10/14* (2006.01)
(52) U.S. Cl. .................... 501/4; 65/33.1; 65/33.8
(58) Field of Classification Search ............... 501/4; 65/33.1, 33.8
See application file for complete search history.

(56) References Cited

U.S. PATENT DOCUMENTS

| | | | |
|---|---|---|---|
| 3,809,524 A | 5/1974 | Lythgoe et al. | |
| 3,809,543 A | 5/1974 | Gaskell et al. | |
| 4,211,820 A | 7/1980 | Cantaloupe et al. | |
| 4,218,512 A | 8/1980 | Allersma | |
| 4,977,110 A | 12/1990 | Amundson, Jr. et al. | |
| 5,491,115 A | 2/1996 | Pfizenmaier et al. | |
| 6,515,263 B2 | 2/2003 | Mitra et al. | |
| 6,846,760 B2 * | 1/2005 | Siebers et al. | 501/32 |
| 7,107,793 B2 * | 9/2006 | Doehring et al. | 65/33.9 |
| 2002/0026932 A1 | 3/2002 | Mitra et al. | |
| 2004/0070120 A1 | 4/2004 | Doehring et al. | |
| 2005/0252503 A1 * | 11/2005 | Siebers et al. | 126/1 R |

FOREIGN PATENT DOCUMENTS

| | | |
|---|---|---|
| EP | 1 170 264 A1 | 1/2002 |
| FR | 1.518.422 | 3/1968 |
| FR | 2.111.752 | 6/1972 |
| WO | 99/06334 | 2/1999 |

* cited by examiner

*Primary Examiner*—Karl Group
(74) *Attorney, Agent, or Firm*—Michael J. Striker (57) ABSTRACT

The method produces a glass-ceramic article substantially in the form of a plate with improved high temperature difference resistance or strength. The glass-ceramic article contains keatite mixed crystals (KMK) or high quartz mixed crystals (HQMK) as well as the keatite mixed crystals (KMK). The method includes heating a glass-ceramic in a high quartz mixed crystal state to form the keatite mixed crystals with a heating rate of 20 K/min to 150 K/min, preferably more than 15 K/min, especially preferably more than 20 K/min. These high heating rates increase the temperature difference resistance.

19 Claims, 12 Drawing Sheets

OKL = OVEN CHARACTERISTIC CURVE

METHOD OF MAKING A GLASS-CERAMIC ARTICLE

BACKGROUND OF THE INVENTION

1. Field of the Invention

The present invention relates to a method of making a glass-ceramic article having a keatite mixed crystal phase in at least a part of its interior.

2. Related Art

It is known that glasses from the $Li_2O$—$Al_2O_3$—$SiO_2$ system may be converted into glass-ceramic articles with high quartz mixed crystals (HQMK) and/or keatite mixed crystals (KMK) as principal crystal phase. The making of these glass-ceramics occurs in several stages. After melting and hot shaping the glass is usually cooled at temperatures in the region of the transformation temperature (Tg), in order to remove thermal stresses. After that the material is further cooled to room temperature.

The starting glass is crystallized with a second controlled temperature treatment and converted into a glass-ceramic article. This ceramicizing occurs in a multi-stage temperature process, in which crystal nuclei are produced by nuclei formation at temperature of 600 to 800° C., usually from $TiO_2$— or $ZrO_2/TiO_2$ mixed crystals. Also $SnO_2$ and $V_2O_5$ can participate in the nuclei formation process.

High quartz mixed crystals grow from these nuclei during heating at crystallization temperatures from about 700 to 900° C. Because of the small crystal sizes of less than 100 nm optically transparent glass-ceramics are produced, which have a high quartz mixed crystal phase. Larger crystallites and thus translucent glass-ceramics based on high quartz mixed crystals may be produced by reducing the nuclei-forming content or ingredients, dependent on the material or the temperature and time course of the process.

The high quartz mixed crystals convert further to keatite mixed crystals during further heating in a range from about 900° C. to 1250° C. The temperature and time conditions for the structural phase changes are dependent on the composition. The conversion to keatite mixed crystals is connected with crystal growth, i.e. increasing crystallite size, whereby increasing light scattering occurs, i.e. light transmission is increasingly reduced. The glass-ceramic article appears increasingly translucent because of that and is eventually opaque.

A key property of the glass-ceramics made from the $Li_2O$—$Al_2O_3$—$SiO_2$ system (LAS system) is the manufacturability of materials, which have a best low thermal expansion coefficient (TAK) in a range from room temperature to 700° C. of below $1.5 \times 10^{-6}$ $K^{-1}$ for materials with keatite mixed crystals as principal crystal phase in addition to the residual glass phase. Glass-ceramics, which contain high quartz mixed crystals as principal crystal phase beside the residual glass phase, are materials with TAK of less than $0.3 \times 10^{-6}$ $K^{-1}$ even in this temperature range, thus a nearly zero thermal expansion. Because of the low thermal expansion the glass-ceramics with HQMK as principal crystal phase have outstanding temperature difference strength (TUF) and temperature change resistance.

Transparent glass-ceramics with high quartz mixed crystals as the principal crystal phase find application, e.g. in fire resistant glass, chimney windows, reflectors in digital protection units (beamers) or as cooking vessels. For application as cooking surfaces a reduction of light transmission to values under 50% is desired, in order to avoid observation of the apparatus under the cooking surface (e.g. with induction cooking surfaces) and to reduce the light radiation from radiating bodies, halogen heated bodies and glass burners to the desired values. This lowering of the light transmission is achieved, e.g. by coloring transparent glass-ceramics with colored metal oxides and by glass-ceramics, which are converted to be translucent or opaque.

Glass-ceramics with high quartz mixed crystals as the predominant crystal phase are most widely used for cooking surfaces. Because of its low thermal expansion coefficient (TAK) of less than $0.3 \times 10^{-6}$ $K^{-1}$ between room temperature and 700° C. these glass-ceramics have outstanding temperature difference resistance or strength (TUF) of greater than 800° C., which satisfies all requirements for a cooking surface.

A high TUF is an indispensable property for a cooking surface. The material in the cooking zone is heated to high temperatures by powerful halogen heating bodies or radiant heating bodies. These high temperatures are desired in order to guarantee rapid cooking. Of course a temperature limiter controls the heating bodies at temperatures above about 560° C., however temperatures on the glass-ceramic cooking surface of up to about 700° C. and more can occur during improper usage, such as heating of an empty pot or when a cooking zone is only partly covered.

The small thermal conductivity of the glass-ceramic of about 1.5 W/mK guarantees that the temperatures near the cooking zones drop off rapidly and their edges remains cold. This is desirable due to safety and energy-saving considerations. The requirement that a radiatively heated or gas heated cooking surface material has a TUF of 700° C. and more results from the combination of the heated cooking zones with cold surrounding areas. Because of that high thermally induced stresses are produced under a thermal load and thus the danger of breakage of the material due to damage of the surface, e.g. by scratching, increases.

Cooking surfaces of glass-ceramic with keatite mixed crystals as the predominant crystal phase have up to now found no wide spread application, because the thermal expansion coefficient (TAK) increases when a high quartz mixed crystal glass-ceramic is converted into a keatite mixed crystal glass-ceramic. The TAK increases between 20 and 700° C. to a value of $\alpha$, which is mainly above $0.5 \times 10^{-6}$ $K^{-1}$. Especially good melting and devitrification resistant compositions are available with high thermal expansion coefficients. With those compositions no sufficient TUF may be obtained for modern cooking surface systems, which have heating bodies of high power.

An opaque glass-ceramic, which has keatite mixed crystals as principal crystal phase and which is colored beige with cerium oxide, is described in U.S. Pat. No. 4,977,110. It is made by crystallization on a temperature plateau between about 1025° C. and 1175° C., starting from a nucleation temperature at about 750° C. to 850° C. The heating rate amounts to a maximum of 4 K/min. The holding time at the maximum temperature amounts to 1 hour. The resulting glass-ceramic has a very high thermal expansion coefficient (TAK) of $1.5 \times 10^{-6}$ $K^{-1}$ between 0 and 300° C.

An opaque glass-ceramic based on keatite mixed crystals, which is colored dark blue with the help of iron oxide and cobalt oxide, is described in U.S. Pat. No. 5,491,115. It is made by a method in which it is heated first to a nuclei formation temperature between 800 and 850° C. with a heating rate of 5 K/min. After that it is brought to a crystallization temperature of 900° C. also with a heating rate of 5 K/min. It is held there for a holding time of 45 to 60 min. In an additional step the temperature is increased to conversion temperature of 1150° C. with a heating rate of 5 K/min prior to cooling the glass-ceramic.

In order to increase the breakage strength of the glass-ceramic plate, up to now the ceramicizing process has been controlled and the composition of the glass selected so that a keatite mixture crystal phase is present as the predominant crystal phase in the interior of the glass-ceramic, while high quartz mixed crystals are the crystal phase in the surface layer. This is for example disclosed in U.S. Pat. Nos. 4,218,512 and 4,211,820, the WO 99/06334 A1 or also EP 1 170 264 A1. Since the thermal expansion of the high quartz mixed crystals is less than that of the keatite mixed crystals a compressive tension or stress is induced during cooling of the glass-ceramic, which counteracts the strength loss by smaller surface damage occurring during usage.

After heating to nuclei formation temperatures between 650 to 760° C. or 675 to 725° C., the crystallization is performed in a temperature range between 760 to 850° C. or 825 to 950° C. in the manufacturing method according to U.S. Pat. No. 4,211,820 and EP 1 170 264 A1. Because of that a keatite mixed crystal phase already forms during crystallization. According to U.S. Pat. No. 4,218,512 the temperature is successively brought to different levels at 593° C., 752° C. and 880° C. with holding times of 2 hours at each level. According to WO 99/06334 several temperatures cycles are repeated one after the other, but each cycle has a different maximum temperature. Also after a nuclei formation stage of about 20 min at 670° C. to 800° C. within from 15 to 30 min the temperature is increased to a maximum temperature between 1050 and 1070° C. with a holding time between 11 and 29 minutes. Proportionally shorter holding times are used with higher maximum temperatures. The maximum heating rates disclosed in this patent are less than or equal to 10 K/min.

EP 1 170 264 A1 discloses temperature difference resistance or strength (TUF) data. The glass-ceramic materials of this EP reference have TUF values >650° C., preferably >700° C. Furthermore samples made according to EP 1 170 264 A1 have impact resistance of >18 cm, average breakage height, as tested with a 200 g heavy steel ball in a ball drop test. It is given as rule that the impact resistance is achievable by a suitable tempering. The disclosed TUF relates to material constants. An increase of this TUF achievable by special ceramicizing is described.

SUMMARY OF THE INVENTION

It is an object of the present invention to provide a method with whose help glass-ceramics converted, entirely or partially, to keatite mixed crystals can be prepared, which have a high mechanical stability and because of that are suitable for providing glass-ceramic cooking surfaces.

It is a further object of the present invention to provide a glass-ceramic article, which has crystal phases that comprise more than 20% by volume, preferably more than 70 Vol. %, of a keatite phase.

Furthermore a substantially plate-shaped keatite mixed crystal glass-ceramic, especially a cooking surface, may be made with the method according to the invention, in which the base temperature difference resistance or strength (Base-TUF, depending on the following material constants: ν, transverse contraction number or Poissson number; σ, breaking strength, MPa; α, linear expansion coefficient, $K^{-1}$; and E, elasticity modulus, GPa) increases to a resulting total TUF. For a first composition range A this resulting total TUF is greater than 500° C., preferably greater than 530° C., which is suitable for cooking surfaces for induction, open gas systems, direct heating systems or oven viewing windows. For a second composition range B this resulting TUF is greater than 700° C., preferably greater than 730° C., which is suitable for cooking surfaces for radiantly heated bodies, gas under glass-ceramic and of course for the products described for the first composition range A, which is usually required for the application areas mentioned above.

This object and others which will be made more apparent hereinafter are attained in a method of making a glass-ceramic article in the form of a plate comprising keatite mixed crystals (KMK) starting from a glass-ceramic containing high quartz mixed crystals (HQMK).

According to the invention the method comprises heating a glass-ceramic containing high quartz mixed crystals with a heating rate of 20 K/min to 150 K/min to convert it from the high quartz mixed crystal state and to form keatite mixed crystals. Preferred embodiments are claimed in the appended dependent claims.

The glass-ceramic made by the method according to the invention is characterized by a high temperature difference resistance or strength (TUF). The reason for this is the additional compressive tension or stresses produced by the conversion process according to the invention in the surface. No high quartz mixed crystal phase is necessary however in the surface of the glass-ceramic in order to provided the compressive stresses in the material, in contrast to the method described in the prior art, namely in U.S. Pat. No. 4,218,512. Thus an expensive and exactly temperature control of the conversion process and the damage or breakage associated with it can be eliminated. When high quartz mixed crystals are in the surface of the glass-ceramic according to the invention, they are present in an only very minor extent.

The method according to the invention is characterized by a heating rate of 20 K/min to 150 K/min, preferably 20 K/min to 80 K/min, and most preferably from 20 K/min to 50 K/min, starting from a high quartz mixed crystal state, i.e. the temperature range, in which predominantly high quartz mixed crystals are formed, into the temperature range, in which predominantly keatite mixed crystal formation occurs.

It has been shown that chemical gradients of potassium and also sodium form in the glass-ceramic in an upper surface thickness range of up to 100 μm, which can lead, among other things, to a great delay in keatite mixed crystal formation in the surface region. The concentrations of potassium and sodium are reduced in this surface layer by evaporation or diffusion. In addition zinc and partially lithium are enriched in about the same thickness region. Because of these chemical concentration gradients the temperature expansion coefficient is different at the surface than it is in the interior. Zinc and lithium lower the thermal expansion coefficient (TAK) of the keatite mixed crystals in the surface. Potassium and sodium lead to a higher TAK of the residual glass phase, with respect to the residual glass phases in the interior. Because the surface region has a lower TAK than that of the interior, compressive stresses are introduced into the surface on cooling of the glass-ceramic. A difference of about $0.1 \times 10^{-6}$ per K (which corresponds to about 10% of the TAK in the interior of the material), is sufficient in order to induce compressive stresses of up to 10 M Pa, which can produce a TUF increase of up to 100 K.

The chemical gradient can be influenced in its development by the conversion conditions. A steep temperature ramp before and during the keatite mixed crystal formation shifts the conversion temperature of the high quartz mixed crystal to keatite mixed crystals to higher temperatures. Because of that the formation speed of the keatite mixed crystals increases and the lower viscosity range after the high quartz mixed crystal formation is passed through more rapidly. Since the viscosity definitely increases on conversion of high quartz mixed crystals to keatite mixed crystals, the diffusion, which counteracts the chemical gradients present, is thus rapidly frozen so that the gradients from the high quartz mixed crystal state are maintained better. The stronger gradients produce a greater difference between the thermal expansion coefficient of the glass-ceramic at the surface and the glass-ceramic in the interior and thus stronger compressive stresses in the surface. Thus keatite glass-ceramics are made with a TUF of up to 850° C. depending on the ceramicizing conditions during the heat up.

This new-found knowledge was put into practice in the method according to the invention especially because three clearly separate temperature plateaus are passed through during ceramicizing: first the nuclei formation at a temperature of about 650 to 760° C., wherein the plateau in nuclei formation can be eliminated, subsequently a crystallization stage at a temperature of about 750° C. to 850° C., in which the chemical gradients between the surface and the interior form, and then a conversion stage in which the high quartz mixed crystal phase is converted into the keatite mixed crystal phase at a temperature between about 950 and 1250° C. It is especially important that a heating rate of more than 10 K/min, especially preferably more than 20 K/min is used for heating to the conversion temperature for conversion to keatite.

In a preferred embodiment the glass-ceramic is made from a glass of each of the following composition ranges A or B, in percent by weight on an oxide basis, according to the following table I.

TABLE I

GLASS COMPOSITION RANGES A & B FOR GLASS-CERAMICS

| Ingredient | Range A | Range B |
|---|---|---|
| $Li_2O$ | 3.5–4.2 | 3.3–4.2 |
| $Na_2O$ | 0–1.0 | 0–0.5 |
| $K_2O$ | 0–0.5 | 0–0.5 |
| $\Sigma\ Na_2O + K_2O$ | 0–1.0 | 0–1.0 |
| MgO | 0–1.3 | 0.5–1.7 |
| $\Sigma\ CaO + SrO + BaO$ | 0.8–2.7 | 0–1.5 |
| ZnO | 0–2.0 | 0–2.0 |
| $Al_2O_3$ | 20.0–23.5 | 18.0–22.0 |
| $SiO_2$ | 62.5–67.5 | 66.5–70.0 |
| $TiO_2$ | 1.8–2.8 | 2.0–5.0 |
| $ZrO_2$ | 1.4–2.5 | 0–2.0 |
| $P_2O_5$ | 0–1.5 | 0–0.5 |

The glass of both composition ranges A and B contains at least one refining agent, especially $As_2O_3$, $Sb_2O_3$, $SnO_2$, sulfate compounds and/or chloride compounds, in a total amount of up to 2.0 percent by weight. Furthermore the glass contains one or more substances from the group consisting of $Na_2O$, $K_2O$, CaO, SrO, BaO, F and refining agents in an amount of from 0.2 to 2.5% by weight in the residual glass phase and/or the glassy surface layer.

Furthermore the glass compositions can be colored, e.g. by colored oxides, especially oxides of the elements Ce, Mn, Ni, Cr, Co, Mo, Fe, V, Cu, Nd, which can be used in a total amount of up to 1.0 percent by weight.

Moreover it has been shown that the impact strength of the tested samples according to the method described in U.S. Patent Publication 2002/0026932 A1 and EP 1170264 B1 reaches average values of greater than 18 cm drop height of a 200 g test ball.

Figure 1:
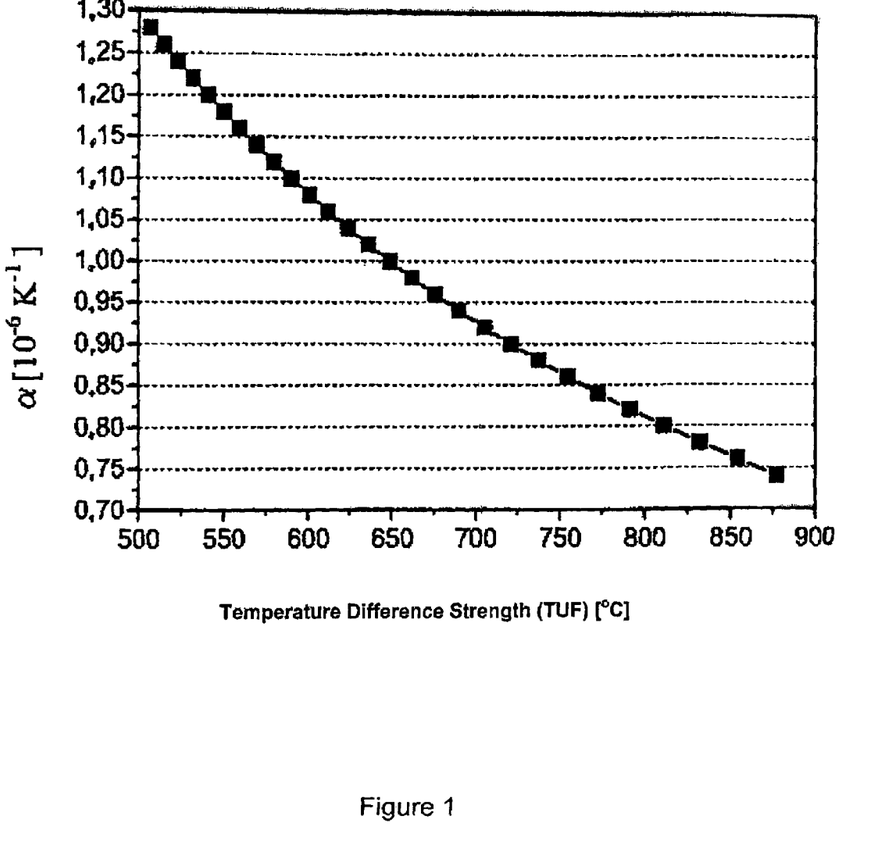
FIG. 1 is a graphical illustration of the relationship between temperature difference resistance (TUF) and thermal expansion coefficient (TAK), which was calculated using $\alpha = 1 \times 10^{-6}$ $K^{-1}$, $\nu = 0.255$ and E=84 GPa.

The temperature different resistance, TUF, of a material is directly connected to the material properties, among other things. Failure of a material occurs, when the thermally induced stresses exceed the breaking strength of the material. The TUF of a material, under the implicit influence of thermal conductivity, is defined as the maximum temperature difference, $\Delta T_{max}$, which may occur within a material between two points A and B with $T_A < T_B$, without causing the material to break or fracture, which according to equation (1) is:

$$\Delta T_{max} = T_B - T_A = \left(\frac{1}{f_1}\right) \cdot \left[\frac{\sigma(1-\nu)}{\alpha \cdot E}\right], \quad (1)$$

wherein $\nu$ is the Poisson number, $\sigma$ is the breaking strength of the material, E is the elasticity modulus, $\alpha$ is the thermal expansion coefficient (TAK), $f_1$ is a correction factor for the plate geometry and the temperature distribution. Based on this definition it is clear that the TAK takes on a greater significance with the same lattice structure and thus identical parameters for $\nu$, $\sigma$ and E. The smaller the TAK, the higher the TUF (see equation 1 above and also FIG. 1). The thermal expansion coefficient, TAK, can be varied from −0.4 and $1.5 \times 10^{-6}$ $K^{-1}$ by suitable temperature-time control of the temperature from 950° C.$<T_{max}<$1250° C. and holding time between 0 and 300 min.

The connection between $\Delta T_{max}$, i.e. the TUF, and $\alpha$, i.e. TAK, is shown by the above equation 1. It follows that a typical TUF for a keatite mixed crystal glass-ceramic of normally 650° C. (bulk TUF, see equation 1) results with typical material data $\nu$, $\sigma$ and E with a similarly typical TAK of $1 \times 10^{-6}$ $K^{-1}$.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

The temperature difference resistance (TUF) is increased with the help of the method according to the invention. Glass-ceramics with a TUF of up to about 750° C. can be made with the method according to the invention. Chemical concentration gradients for KMK glass-ceramics with different high TUF values, which were measured by X-ray fluorescence analysis, are illustrated in FIGS. 2a to 2d.

Figure 2A:
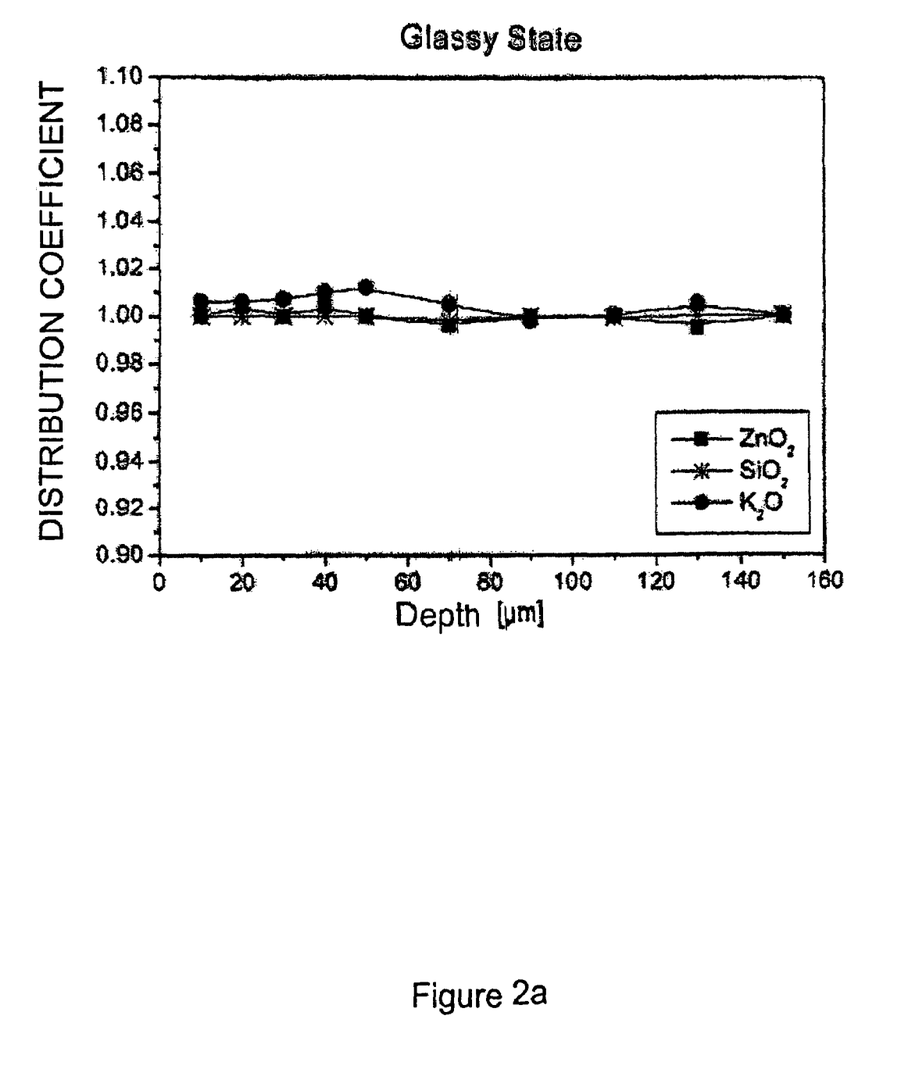
FIGS. 2a to 2d are graphical illustrations of the variation of chemical concentrations of various species with depth from the surface in the glassy state, in the HQMK state (pre-ceramicized), in a KMK state with TUF=692° C. and in the KMK state with TUF=756° C., respectively.
Figure 2B:
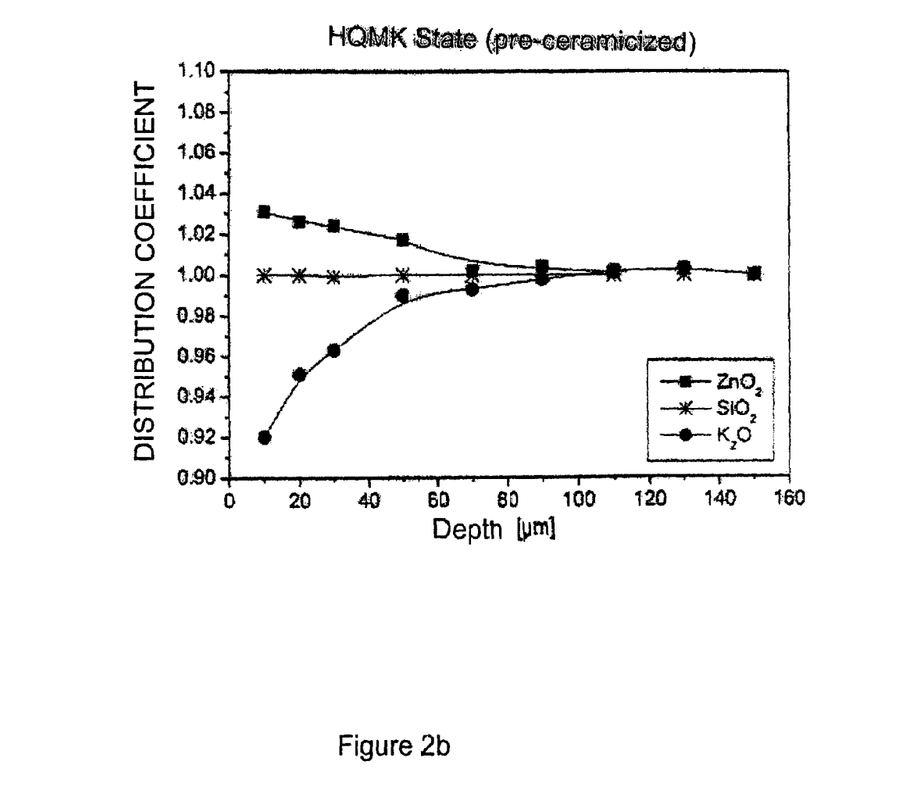
Figure 2C:
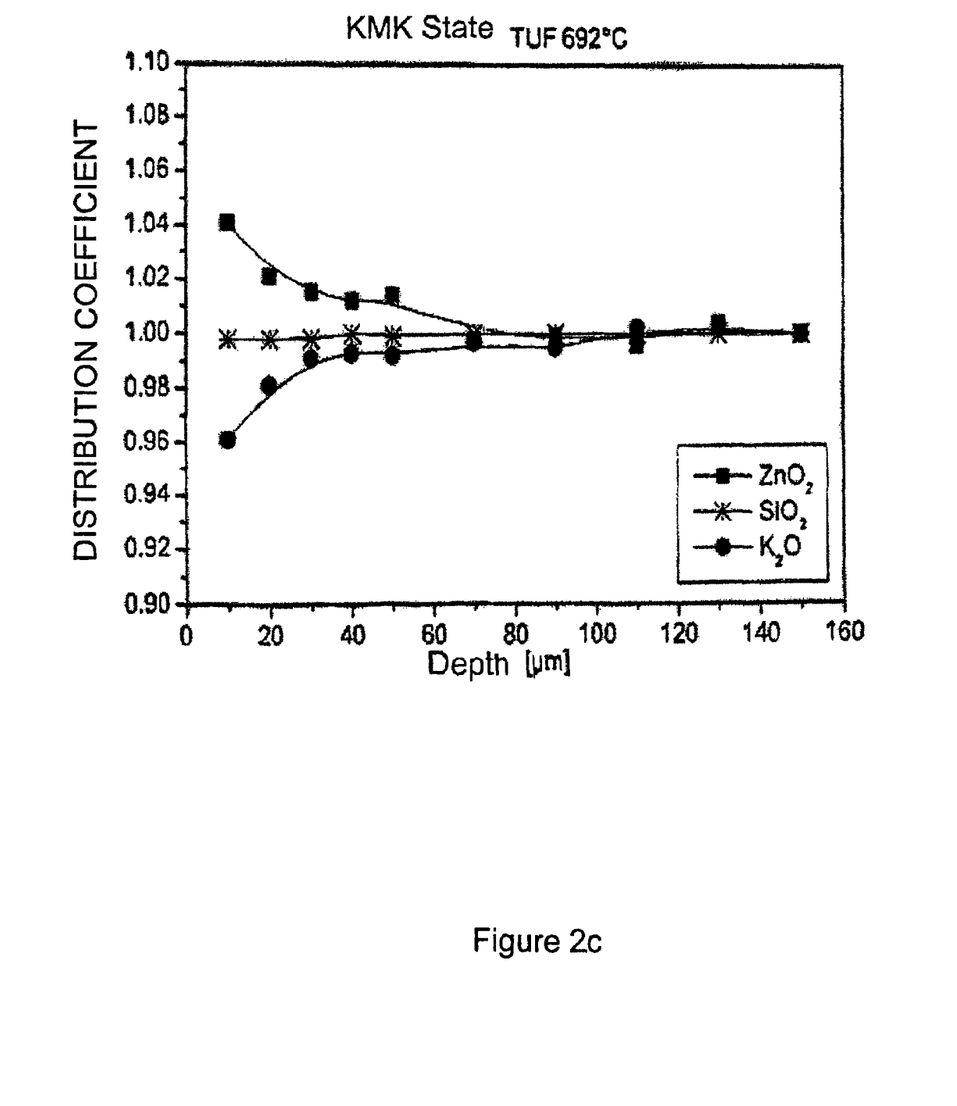
Figure 2D:
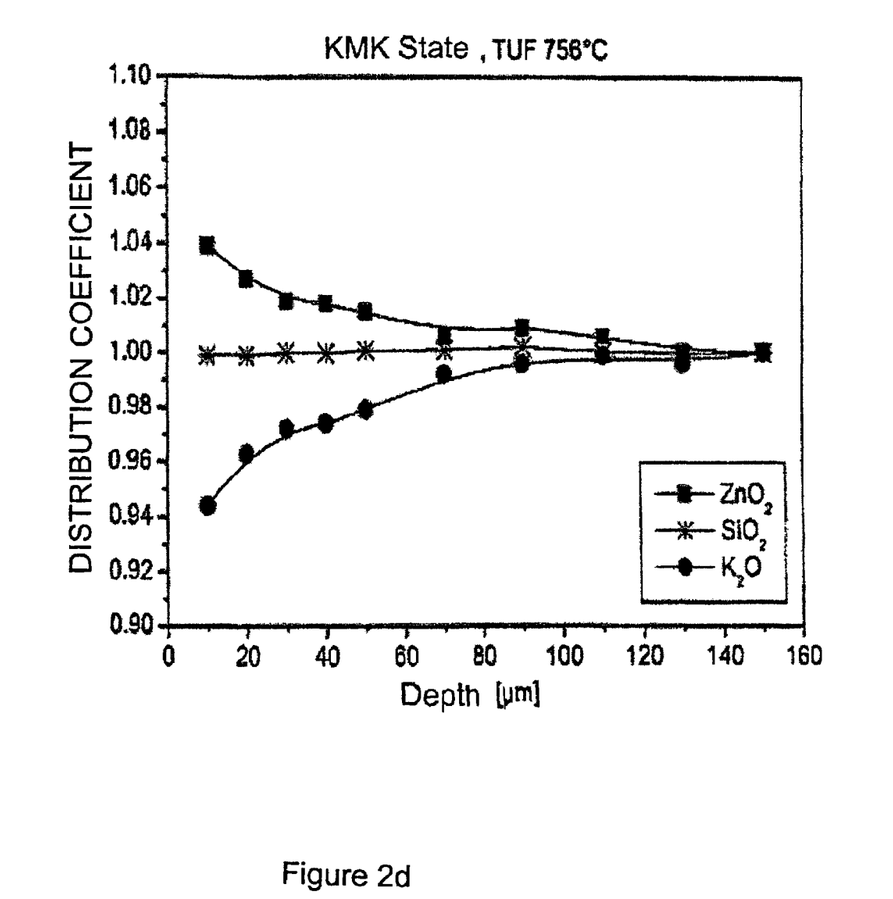

The distribution coefficients (defined as the ratio of concentration at the surface to bulk, wherein the concentration in bulk is measured at a constant depth greater than 150 μm) of zinc oxide, silicon dioxide and potassium oxide in the glass state at various depths greater than 160 μm are illustrated in FIG. 2a. These same distribution coefficients are shown in FIG. 2b for the pre-ceramicized state, i.e. measured in the high quartz mixed crystal phase. In contrast to the glass state, in which the distribution coefficients for all three components is essentially a constant value equal to 1 over the tested depths, a slight enrichment of zinc and reduction of potassium is observed at various depths up to about 60 to 80 μm in the high quartz mixed crystal state. A keatite mixed crystal glass-ceramic with a TUF of 692° C. is illustrated in the depth profile of FIG. 2c. An enrichment of zinc and reduction of potassium is established at depths up to 50 to 60 μm. In contrast these zinc and potassium gradients extend to a depth of about 100 μm in a keatite mixed crystal glass-ceramic with a TUF of 756° C., as shown in FIG. 2d.

Figure 3:
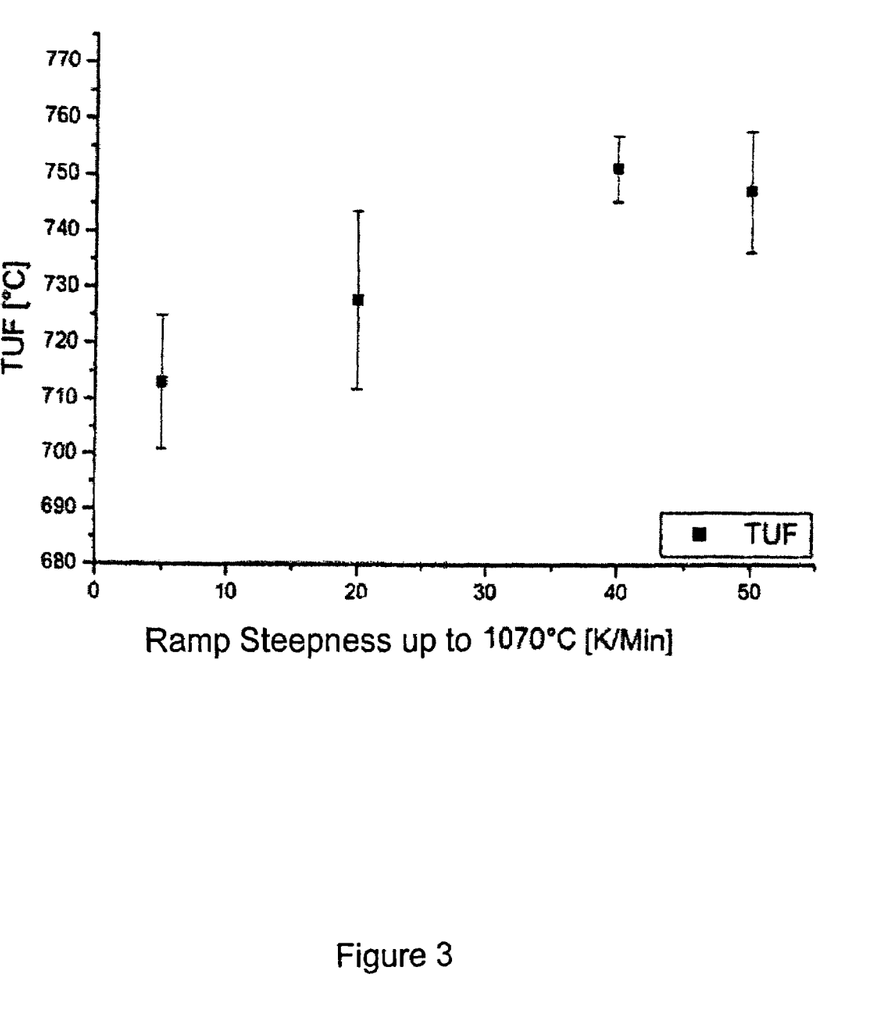
FIG. 3 is a graphical illustration of the connection between temperature difference strength (TUF) and heating rate (ramp steepness)

This shows that in contrast to commercially made keatite mixed crystal glass-ceramics chemical gradients induced and maintained in the glass-ceramics made according to the invention are more pronounced, extend to greater depths and are larger at the same depth than in commercial keatite mixed crystal glass-ceramics. This can be attributed to a significant increase of the TUF. The potential of this method-dependent TUF increase is shown in FIG. 3. Table II below shows that the TUF can influenced by the heating rate for glass-ceramics in the composition range A and in the composition range B.

TABLE II

VARIATION OF TUF WITH HEATING RATE

| Glass-ceramic composition range | 2 K/min heating rate | 22 K/min heating rate |
| --- | --- | --- |
| A | TUF = 500° C. | TUF = 560° C. |
| B | TUF = 660° C. | TUF = 740° C. |

It has been shown that it is possible to interrupt the ceramicizing and to reach a high TUF on conversion into KMK state with a glass-ceramic already converted into the HQMK state. This can be explained since the gradients set up in the HQMK state are only slightly influenced by the intervening cooling and interruption of the ceramicizing process. Because of that it is possible to perform the conversion into the HQMK state in a different oven that the oven used for the KMK conversion. The KMK conversion can also be performed in pre-ceramicized material (material, in which HQMK is already present as the crystal phase) according to the method described in claim 1 below to reach a high TUF. In order to adjust the chemical gradients it is necessary to perform the conversion with a high heating rate of 10 K/min to 150 K/min, preferably of 15 K/min to 80 K/min, especially preferably 20 K/min to 50 K/min at 950° C. to 1250° C. with a holding time at the maximum temperature of 0 to 200 min, ideally less than 30 min.

It has been shown that the TUF is about 726±15° C. with pre-ceramicized material in composition range B as starting material (ceramicized in different ovens), in comparison to about 749±22° C. when the ceramicizing occurs in a single step in one and the same oven. The TUF of a glass-ceramic, which was not converted according to the described method, was about 692° C. This illustrates the trends on TUF due to the pre-ceramicizing. This is caused because the material was already heated up to about 900° C. and the chemical gradients were obviously negatively affected by that and partially compensated. Still it is possible to use pre-ceramicized material and thus to obtain an increase of the TUF according to the described method.

Furthermore it has proven advantageous when the cooling occurs with a not-too-low temperature decrease or cooling rate. It has been shown that the cooling rate should be more than 2 K/min, preferably at least 20 K/min. The above-mentioned chemical concentration gradients are preserved with large cooling rates (rapid cooling) greater than 2 K/min. Compensation of these gradients and decrease of surface tension and the TUF because of diffusion as a result of slow cooling are prevented by these larger cooling rates. These effects are based on the occurrence of gradient compensation during the slower cooling. However the gradients react slower and less sensitively to the low viscosity at high temperatures than the tension or stress. A maximum possible preservation of the gradient is achieved at a certain cooling rate. Thus no further significant TUF increases can be attained by extremely rapid cooling, e.g. a cooling rate of 50 K/min and higher. A cooling rate, which fits the respective composition that is employed in the method, can be readily and easily determined by one skilled in the glass-ceramic art.

Figure 4:
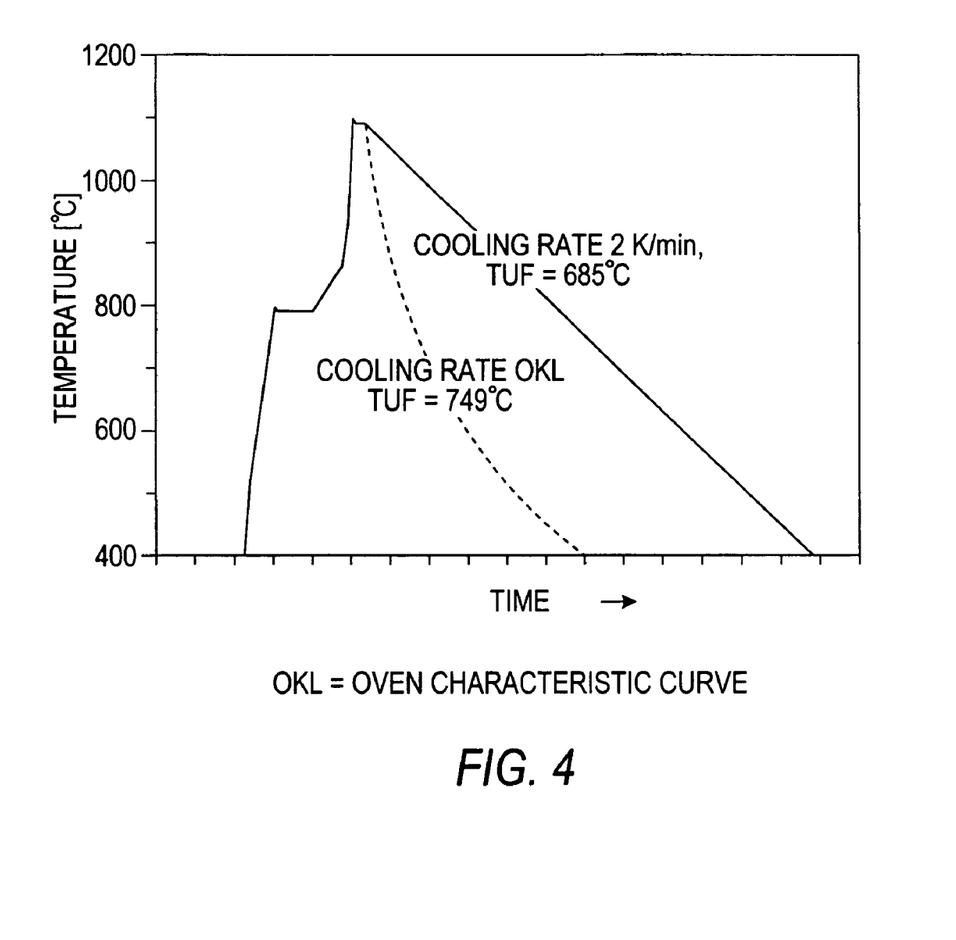
FIG. 4 is a graphical illustration of the connection between temperature difference strength (TUF) and cooling rate.

The TUF values obtained with different cooling rates from the maximum temperature to about 400° C. are illustrated in FIG. 4. A TUF value of only 685° C. is obtained with the slow and constant cooling rate of 2 K/min. If the cooling rate is in a range from 10 to 20 K/min, a TUF value of 749° C. is obtained. These cooling rates correspond to the characteristic curve (OKL). This characteristic curve OKL corresponds to cooling rates, which occur when the oven is turned off. Extremely rapid cooling, such as 60 K/min, obtains no noteworthy TUF improvements. An upper limit to the cooling is established because the cooling cannot be so rapid that the cooling introduces additional damaging stresses in the glass-ceramic (see FIG. 4). The temperatures shown in FIG. 4 are measured values, i.e. actual temperatures.

The making of high quartz mixed crystal phase occurs from green glass, i.e. still not crystallized glass, by first heating with a heating rate up to nuclei formation prior to the HQMK formation of 10 K/min to 150 K/min, especially 15 K/min to 40 K/min, up to a nuclei formation temperature of about 650° C. to 760° C. At this temperature the nuclei formation takes place with a holding time between 0 and 30 min, especially of less than 15 min. Subsequently heating occurs with a heating rate of 5 K/min to 30 K/min, especially 10 K/min to 20 K/min, up to HQMK formation. The crystallization of the HQMK phase takes place at a temperature of from about 760° C. to 900° C. and a holding time of 0 min to 90 min, preferably less than 30 min. This method of making the high quartz mixed crystal phase is indeed known and e.g. described in detail in U.S. Pat. No. 6,515,263.

The thermal expansion coefficient (TAK) has a significant influence on the TUF. For a given gas composition it depends on the temperature/time conditions, at which the conversion from HQMK to KMK is performed. Especially the value of alpha is determined by the residual portion of the HQMK crystals and/or the glass phase. That means generally the higher the burning-in temperature, the higher the TAK for a given constant glass composition.

The TAK can be varied between $-0.4\times10^{-6}$/K and $1.51\times10^{-6}$/K with glass-ceramics in the composition ranges A and B, e.g. by variation of the maximum burning-in temperature (Tmax) between 995° C. and 1250° C. and with a 7 min holding time. The alpha value (TAK) e.g. is $0.8\times10^{-6}$/K when Tmax=1020° C. The TAK relates to the temperature range 20–700° C.

A 0.1 to 2.5 µm thick surface layer, which is substantially glass phase or in the glass state, i.e. largely high quartz crystal-free and keatite mixed crystal-free, is formed in the material during the burning-in in an electrical oven. The concentration of one or more substances from the group $Na_2O$, $K_2$, CaO, SrO, BaO, B oxides, F and refining agents in this predominantly amorphous surface layer is significantly increased in comparison to the bulk composition. In contrast the amount of $Li_2O$ as well as MgO, ZnO, NiO and Co oxides is reduced in the surface layer relative to the bulk composition.

The predominantly amorphous surface layer, poor in Li ions, has increased chemical resistance in both HQMK and also KMK glass-ceramics. The thicker the amorphous layer, the more resistant the glass-ceramic is e.g. to attack by reactive gases, such as $SO_2$ formed by combustion of gas or liquid.

Figure 5A:
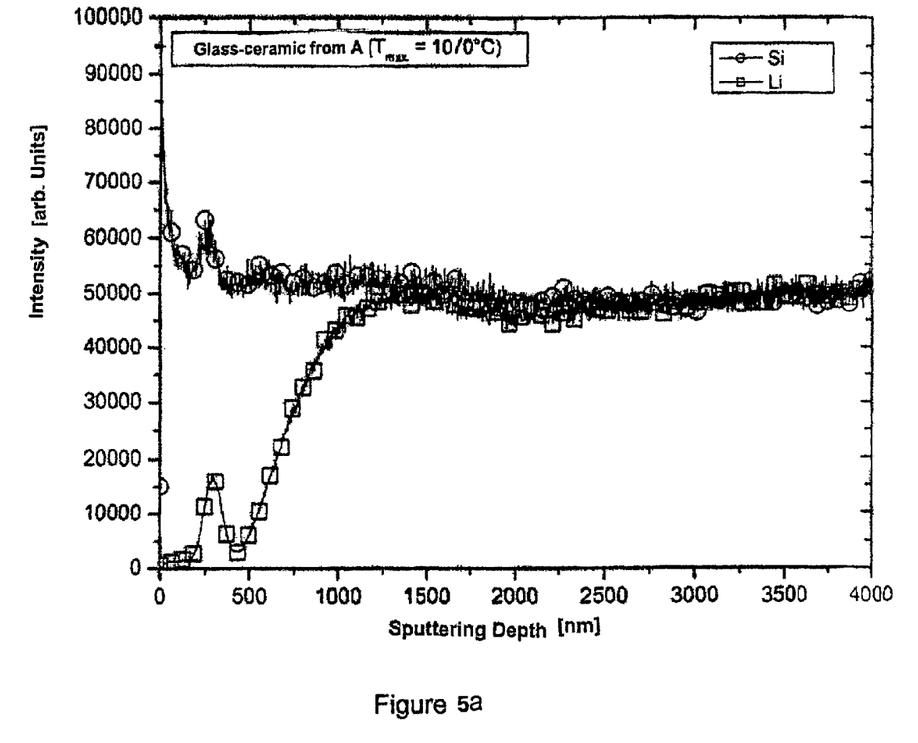
FIGS. 5a and 5b are graphical illustrations of the depth profile of Li and Si ions in a glass-ceramic in the KMK state as determined with secondary ion mass spectrometry (SIMS) for glass-ceramics of composition ranges A and B.
Figure 5B:
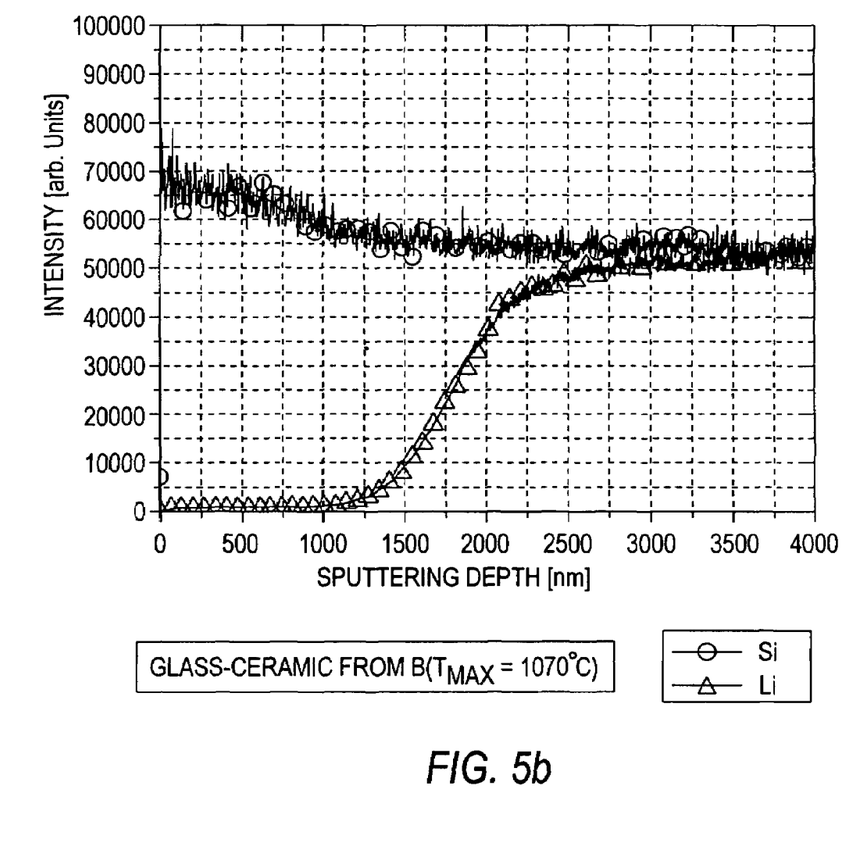

The thickness of the largely amorphous layer of HQMK and KMK glass-ceramics can be influenced both by the burning-in and also the composition of the starting glass, as demonstrated in FIG. 5. AS is apparent from the depth profile measured by secondary element mass spectroscopy (SIMS), a generally thicker Li-poor surface layer (up to 3 µm) is obtainable in the KMK state than in the HQMK state (thickness usually less than 1 µm). When the thickness of this layer exceeds a certain thickness dependent on the material (e.g. 2 µm for HQMK glass-ceramics), cracking or flaws can occur after ceramicizing.

The glass-ceramic can be colored by addition of colored additives, especially by addition of metal oxides. Basically this is a matter of a coloring of the bulk or volume of the glass-ceramic. Preferably V, Cr, Mn, Ce, Fe, Co, Mo, Cu, Ni and/or Se—Cl compounds are used to color the glass-ceramic. For example, a blue color can be obtained using cobalt. A gray shade can be obtained by addition of vanadium with keatite mixed crystals as the principal crystal phase. The color of the glass-ceramic can be changed by appropriate ceramicizing conditions starting from a base color shade. The color shade can be varied from light to dark by temperature control between about 950 and 1250° C. and holding times between about 0 and 300 min. Also various pleasing impressions can be achieved by the colored or colorless glass-ceramics, which have a milky glass-like appearance to an opaque condition, by conversion into the HQMK state, the KMK state or an intermediate state. A color change can occur at lower ceramicizing temperatures, e.g. 920° C., however the processing time increases considerably.

Figure 6A:
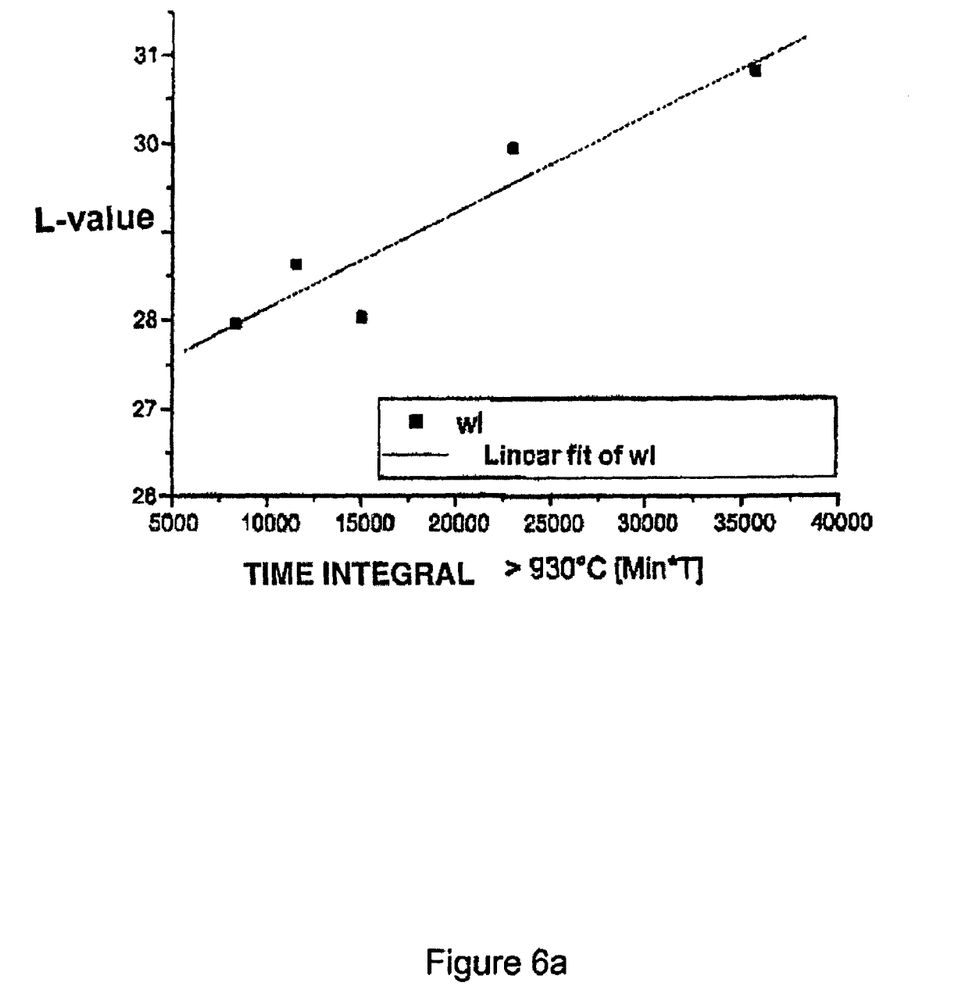
FIGS. 6a to 6c are graphical illustrations showing the dependence of L, a, b color parameters of a glass-ceramic B as a function of the integral time above 930° C., respectively.
Figure 6B:
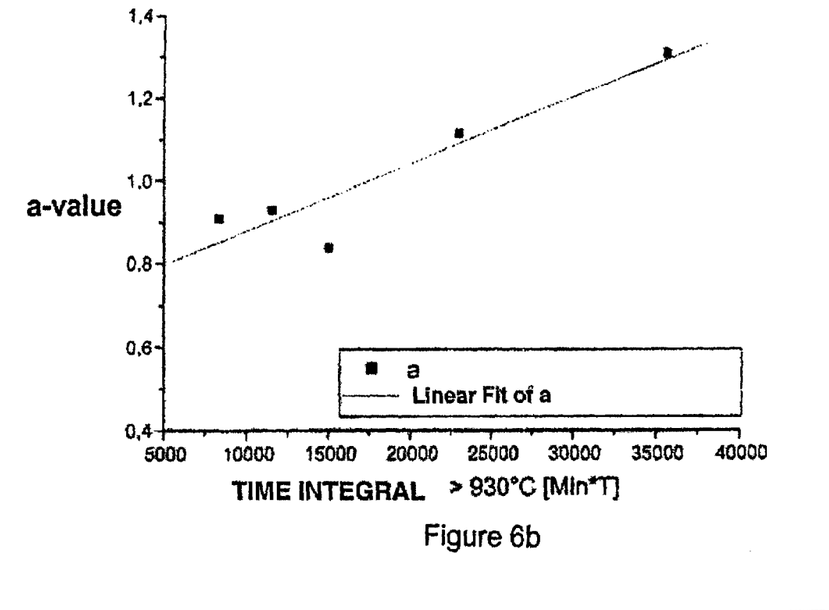
Figure 6C:
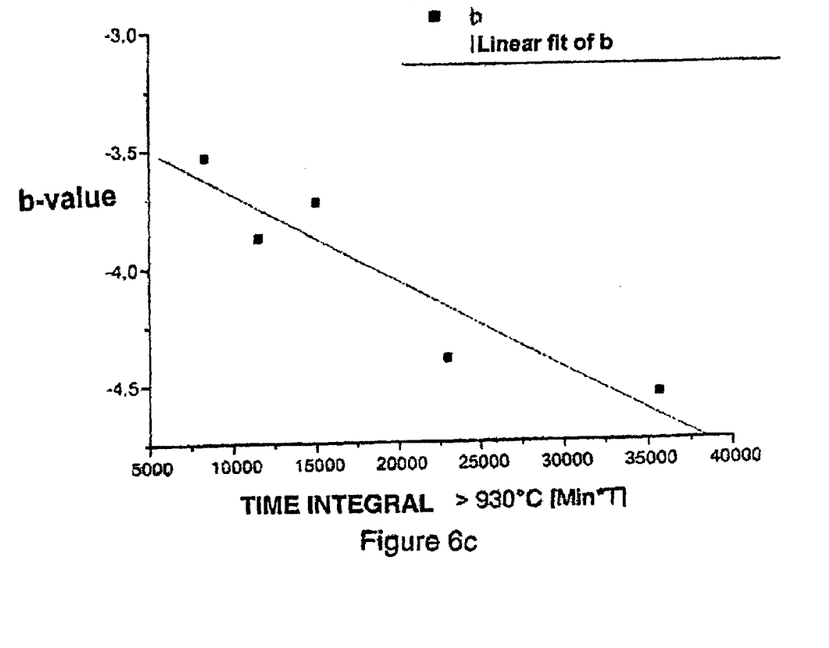

The measured color parameters L, a, b in the CIE lab system are shown for a glass-ceramic having a dark-gray color shade in FIGS. 6a to 6c. This glass-ceramic contains between 400 to 1500 ppm of $V_2O_5$. The respective color parameters are plotted versus the time integral for temperature greater than 930° C. in min×K. The L-value, which defines the white-black proportion, increases with higher maximum temperature or longer holding time (FIG. 6a). Similarly the a-value, which defines the red-green proportion, increases with higher maximum temperature and/or longer holding time (FIG. 6b). The b-value, which defines the yellow-blue proportion, in contrast however decreases with increasing holding time and/or maximum temperature (FIG. 6c). Thus glass-ceramics may be produced, which e.g. are colorless, black, white, gray, beige, flue, yellow, red green and various mixed shades.

Figure 7:
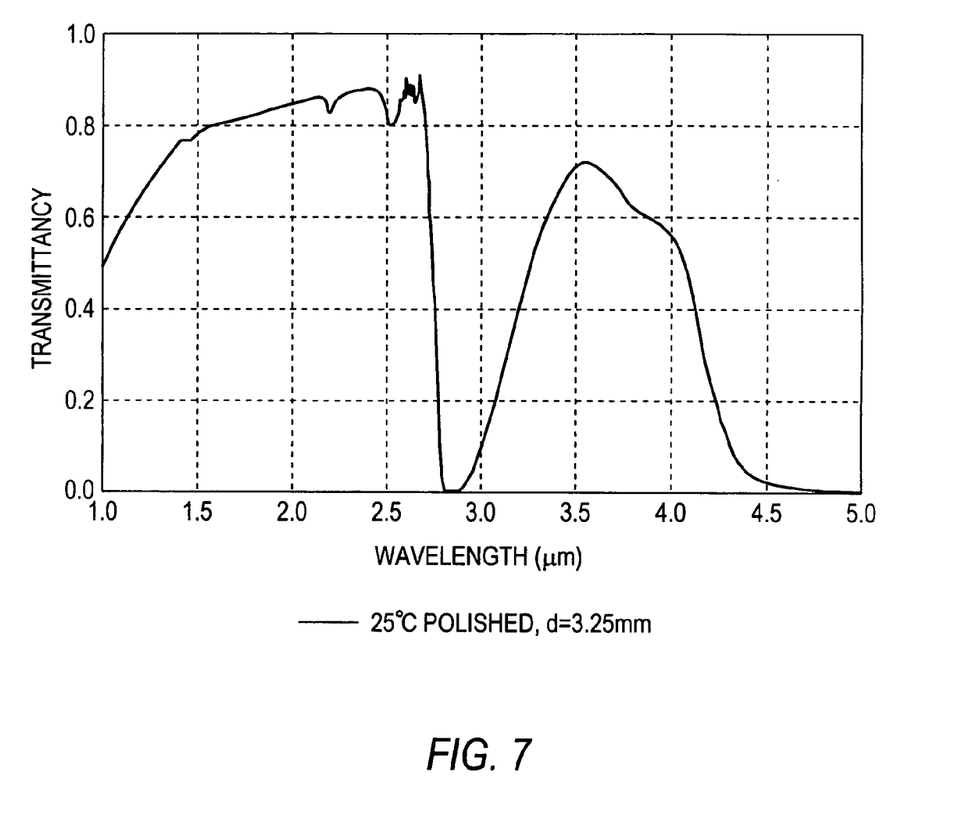
FIG. 7 is a graphical illustration showing the transmission of a freshly polished glass-ceramic of composition B in the infrared region at room temperature.

The transmission spectrum of a glass-ceramic made by the method according to the invention in the infrared spectral range is shown in FIG. 7. The KMK glass-ceramic made according to the invention is characterized by a high transmission up to a wavelength of 2.5 µm, which contributes to its suitability for use as a radiatively heated cooking plate. A transmission drop above 2.5 µm is caused by the residual water contained in the glass-ceramic. A peak in the IR transmission occurs again in a range between 3.2 and 4.1 µm.

The disclosure in German Patent Application 10 2004 024 584.3-45 of May 12, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of making a glass-ceramic article, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a glass-ceramic article substantially in the form of a plate, said glass-ceramic article containing keatite mixed crystals (KMK) or containing high quartz mixed crystals (HQMK) as well as said keatite mixed crystals (KMK), said method comprising heating a glass-ceramic in a high quartz mixed crystal state to form said keatite mixed crystals with a heating rate of 20 K/min to 150 K/min.

2. The method as defined in claim 1, wherein said heating rate is from 20 K/min to 80 K/min.

3. The method as defined in claim 1, wherein said heating rate is from 20 K/min to 50 K/min.

4. The method as defined in claim 1, wherein conversion of a high quartz mixed crystal phase into a keatite mixed crystal phase occurs
  either directly following formation of the high quartz mixed crystal phase in an oven in which said high quartz mixed crystal phase was formed, or
  after formation of the high quartz mixed crystal phase in another oven different from said oven by heating from a temperature of 950° C. to 1250° C. with said heating rate and with a holding time of from 0 to 200.

5. The method as defined in claim 4, wherein said holding time is less than 30 min.

6. The method as defined in claim 1, further comprising cooling with a cooling rate of greater than 2 K/min to 50 K/min after formation of said keatite mixed crystals (KMK).

7. The method as defined in claim 6, wherein said cooling rate is greater than 15 K/min.

8. The method as defined in claim 1, further comprising heating a green glass body at a heating rate of 10 K/min to 150 K/min up to crystal nuclei formation for the high quartz mixed crystal state, forming the crystal nuclei at a temperature from 650° C. to 760° C. with a holding time between 0 and 30 minutes, heating at a heating rate of 5 K/min to 30 K/min up to high quartz mixed crystal formation and crystallizing the glass-ceramic in the high quartz mixed crystal state at a temperature of 760° C. to 900° C. with a holding time of 0 to 90 min.

9. The method as defined in claim 8, wherein said heating rate up to said crystal nuclei formation is from 15 K/min to 40 K/min.

10. The method as defined in claim 8, wherein said holding time during formation of the crystal nuclei is less than 15 min.

11. The method as defined in claim 8, wherein said heating rate up to said high quartz mixed crystal formation is from 10 K/min to 20 K/min.

12. The method as defined in claim 8, wherein said holding time during the crystallizing is less than 30 min.

13. The method as defined in claim 1, wherein the glass-ceramic article has a thermal expansion coefficient between $-0.4 \times 10^{-6}/K$ and $1.51 \times 10^{-6}/K$ as determined by selection of a maximum burning-in temperature and a holding time.

14. The method as defined in claim 1, wherein said glass-ceramic has a composition (A), in percent by weight on an oxide basis, of:

| | |
|---|---|
| $Li_2O$ | 3.5–4.2 |
| $Na_2O$ | 0–1.0 |
| $K_2O$ | 0–0.5 |
| $\Sigma\ Na_2O + K_2O$ | 0–1.0 |
| MgO | 0–1.3 |
| $\Sigma\ CaO + SrO + BaO$ | 0.8–2.7 |
| ZnO | 0–2.0 |
| $Al_2O_3$ | 20.0–23.5 |
| $SiO_2$ | 62.5–67.5 |
| $TiO_2$ | 1.8–2.8 |
| $ZrO_2$ | 1.4–2.5 |
| $P_2O_5$ | 0–1.5 | and up to 2.0% by weight of at least one refining agent; and wherein the glass-ceramic has a residual glass phase or glassy surface layer, said glass phase or said glassy surface layer contains at least one substance selected from the group consisting of $Na_2O$; $K_2O$; CaO; SrO; BaO; F; and refining agents, and said glass phase or said glassy surface layer optionally contains at least one colored oxide of Ce, Mn, Ni, Cr, Co, Mo, Fe, V and/or Cu;

wherein the refining agents, when present in said glass phase or said glassy surface layer, are contained in an amount of from 0.2 to 2.5% by weight.

15. The method as defined in claim 14, wherein said refining agents comprise $As_2O_3$, $Sb_2O_3$, $SnO_2$, sulfate compounds and/or chloride compounds.

16. The method as defined in claim 1, wherein said glass-ceramic has a composition (B), in percent by weight on an oxide basis, of:

| | |
|---|---|
| $Li_2O$ | 3.3–4.2 |
| $Na_2O$ | 0–0.5 |
| $K_2O$ | 0–0.5 |
| $\Sigma\ Na_2O + K_2O$ | 0–1.0 |
| MgO | 0.5–1.7 |
| $\Sigma\ CaO + SrO + BaO$ | 0–1.5 |
| ZnO | 0–2.0 |
| $Al_2O_3$ | 18.0–22.0 |
| $SiO_2$ | 66.5–70.0 |
| $TiO_2$ | 2.0–5.0 |
| $ZrO_2$ | 0–2.0 |
| $P_2O_5$ | 0–0.5 | and up to 2.0% by weight of at least one refining agent; and wherein the glass-ceramic has a residual glass phase or glassy surface layer, said glass phase or said glassy surface layer contains at least one substance selected from the group consisting of $Na_2O$; $K_2O$; CaO; SrO; BaO; F; and refining agents and said glass phase or said glassy surface layer optionally contains at least one colored oxide of Ce, Mn, Ni, Cr, Co, Mo, Fe, V and/or Cu;

wherein the refining agents, when present in said glass phase or said glassy surface layer, are contained in an amount of from 0.2 to 2.5% by weight.

17. The method as defined in claim 16, wherein said refining agents comprise $As_2O_3$, $Sb_2O_3$, $SnO_2$, sulfate compounds and/or chloride compounds.

18. The method as defined in claim 1, further comprising coloring said glass-ceramic by addition of metal oxides.

19. The method as defined in claim 18, wherein said metal oxides are colored oxides of V, Cr, Mn, Ce, Fe, Co, Mo, Cu and/or Ni.

* * * * *